(12) United States Patent
Tseng et al.

(10) Patent No.: US 8,929,312 B2
(45) Date of Patent: Jan. 6, 2015

(54) DYNAMIC RESOURCE MANAGEMENT FOR ORTHOGONAL FREQUENCY DIVISION MULTIPLE ACCESS WIRELESS NETWORKS

(75) Inventors: Li-Chuan Tseng, Hsinchu (TW); Ahmed Farhan Hanif, Evry (FR); ChingYao Huang, Hsinchu (TW)

(73) Assignee: Transpacific IP Management Group Ltd., Taipei (TW)

( * ) Notice: Subject to any disclaimer, the term of this patent is extended or adjusted under 35 U.S.C. 154(b) by 295 days.

(21) Appl. No.: 13/396,453

(22) Filed: Feb. 14, 2012

(65) Prior Publication Data

US 2013/0064188 A1 Mar. 14, 2013

Related U.S. Application Data

(60) Provisional application No. 61/534,865, filed on Sep. 14, 2011.

(51) Int. Cl.
*H04W 4/00* (2009.01)
*H04W 72/08* (2009.01)
*H04W 16/12* (2009.01)
*H04W 84/04* (2009.01)

(52) U.S. Cl.
CPC .......... *H04W 72/082* (2013.01); *H04W 84/045* (2013.01); *H04W 16/12* (2013.01)
USPC ........................................................ 370/329

(58) Field of Classification Search
CPC ................................................. H04W 72/0426
USPC ........................................................ 370/329
See application file for complete search history.

(56) References Cited

PUBLICATIONS

Keynyoung Kim et al. , Joint Subcarrier and Power Allocation in Uplink OFDMA systems, IEE, 2005, entire document.*
Keynyoung Kim et al. , Subcarrier and Power Allocation in OFDMA systems, IEE, 2004, entire document.*
Ioannis G. Fraimis et al., A Decentralized Subchannel Allocation Scheme with Inter-Cell Interference Cordination (ICIC) for Multi-Cell OFDMA systems, IEE, 2010, entire document.*
Sang-Wook Han et al. , A Competative Fair Subchannel Allocation for OFDMA system using an Auction Algorithm, IEEE, 2007, entire document.*
Bo Gui et al., Resource allocation Algorithms for multiuser cooperative OFDMA systems with subchannel Permutation , IEEE, 2008, entire document.*
Guocong Song, et al., Cross Layer Optimization for OFDM Wireless Networks—Part 1: Theoretical framework, IEEE, 2005, entire document.*

(Continued)

*Primary Examiner* — Mark Rinehart
*Assistant Examiner* — Maharishi Khirodhar
(74) *Attorney, Agent, or Firm* — Amin, Turocy & Watson, LLP

(57) ABSTRACT

The disclosed subject matter relates to dynamic resource management for wireless network components with a wireless communications environment. Personal base stations can be deployed in a substantially uncoordinated manner resulting in conflicts among wireless radio resources. Dynamically assigning subchannel and dynamically allocating power for subchannels can reduce these conflicts. Dynamic resource management can employ combinatorial auction schema such that assignment of subchannels can be considerate of selecting a power level for performance and to minimize overlapping subchannel interference. In an aspect, several methods can be employed to reduce the computational complexity of the general integer programming problem presented. These several methods can include a Combinatorial Auction with Greedy Algorithm scheme, a Random Equal Subchannel Partition scheme, a Local Combinatorial Auction scheme, and a Neighbors' Poor Channels scheme.

45 Claims, 14 Drawing Sheets

(56) References Cited

PUBLICATIONS

Keynyoung Kim et al., Joint Subcarrier and Power Allocation in Uplink OFDMA systems, IEE, 2005, entire document.*

Hyunduk jung, IEICE, Interference Avoidance and resource allocation for OFDMA downlink of femtocells and distributive power control, 2010.*

Guocong Song, et al., Cross Layer Optimization for OFDM Wireless Networks—Part 1 Theoretical framework, IEEE, 2005, entire document.*

Mingming Li, et al, Resource Allocation With subcarrier cooperation in OFDM based wireless multicast System, May 15-18, 2011 IEEE, entire document.*

Bo Gui et al., Resource allocation Algorithms for multiuser cooperative OFDMA systems with subchannel Permutation, IEEE, 2008, entire document.*

Keynyoung Kim et al., Subcarrier and Power Allocation in OFDMA systems, IEE, 2004, entire document.*

Sang-Wook Han et al., A Competative Fair Subchannel Allocation for OFDMA system using an Auction Algorithm, IEEE, 2007, entire document.*

Ioannis G. Fraimis et al., A Decentralized Subchannel Allocation Scheme with Inter-Cell Interference Cordination (ICIC) for Multi-Cell OFDMA systems, IEE, 2010, entire document.*

Byung-Gook, kim, Utility based subchannel allocation for OFDMA femtocell Networks, 2011, IEEE.*

Ali, et al., "Dynamic frequency allocation in fractional frequency reused OFDMA networks." Wireless Communications, IEEE Transactions on, 8(8):4286-4295, 2009.

Chandrasekhar, et al., "Spectrum allocation in tiered cellular networks." Communications, IEEE Transactions on DOI—10.1109/TCOMM.2009.10.080529, 57(10):3059-3068, 2009.

Chandrasekhar, et al., "Power control in two-tier femtocell networks." Wireless Communications, IEEE Transactions on, 8(8):4316-4328, 2009, 28 pages.

Chandrasekhar, et al., "Femtocell networks: a survey." Communications Magazine, IEEE, 46(9):59-67, 2008, 9 pages.

Femtoforum. Interference Management in OFDMA Femtocells. 2010.

Huang, et al., "Joint scheduling and resource allocation in uplink OFDM systems for broadband wireless access networks." Selected Areas in Communications, IEEE Journal on, 27(2):226-234, 2009, 9 pages.

IEEE. 802.16m Evaluation Methodology Document (EMD). 2009.

Ji, et al., "Non-cooperative uplink power control in cellular radio systems." ACM Wireless Networks, 4:233-240, 1998.

Jo, et al., "Interference mitigation using uplink power control for two-tier femtocell networks." Wireless Communications, IEEE Transactions on, 8(10):4906-4910, 2009, 13 pages.

Lee, et al., "Distributed Channel Selection Principles for Femtocells with Two-Tier Interference." Vehicular Technology Conference (VTC 2010-Spring), 2010 IEEE 71st, pp. 1-5.

Lee, et al., "Interference management in LTE femtocell systems using Fractional Frequency Reuse." Advanced Communication Technology (ICACT), 2010 The 12th International Conference on, pp. 1047-1051, 2010.

Lopez-Perez, et al., "Interference avoidance and dynamic frequency planning for WiMAX femtocells networks." Communication Systems, 2008. ICCS 2008. 11th IEEE Singapore International Conference on, pp. 1579-1584, 6 pages.

Nisan, et al., "Combinatorial Auctions of Algorithmic Game Theory." Cambridge University Press, 2007, 42 pages.

Wang, et al., "Price-Based Spectrum Management in Cognitive Radio Networks." Selected Topics in Signal Processing, IEEE Journal of, 2(1):74-87, 2008.

Xia, et al., "Open vs. Closed Access Femtocells in the Uplink." Wireless Communications, IEEE Transactions on, pp. (99):1-12, 2010, 26 pages.

* cited by examiner

Initialization, set $l = 0$;
repeat
    for $i = 1$ to $N_{fAP}$ do
        Determine power level for $i^{th}$ subchannel;
    end
    for $i = 1$ to $N\,user$ do
        Communicate the determined power level to other wireless network components;
    end
    $l = l + 1$;
until $l > L_{\max} or \left( \left\| p_i^{(l)} - p_i^{(l-1)} \right\| / p_i^{(l-1)} \right) \leq \varepsilon \forall i$;

FIG. 8

DYNAMIC RESOURCE MANAGEMENT FOR ORTHOGONAL FREQUENCY DIVISION MULTIPLE ACCESS WIRELESS NETWORKS

RELATED APPLICATIONS

This application claims the benefit of U.S. Provisional Application No. 61/534,865, filed 14 Sep. 2011, which is hereby incorporated by reference in its entirety.

TECHNICAL FIELD

The various embodiments of the subject disclosure relate generally to wireless communications, and more particularly to dynamic management of subchannels and power levels of components associated with wireless communications.

BACKGROUND

Orthogonal Frequency-Division Multiple Access (OFDMA) is a multi-user version of Orthogonal Frequency-Division Multiplexing (OFDM). Multiple access is achieved in OFDMA by assigning subsets of subcarriers to individual users. This can allow simultaneous transmission from several users at a low data rate. OFDMA can be employed in wireless network components, including carrier base stations (BS or NodeB) and in personal base stations, such as femtocells, picocells, etc. These personal base stations can also sometimes be referred to as evolved NodeB or eNodeB. These personal base stations, e.g., femtocells, are small base stations that are usually installed in indoor environments to improve the data rate areas of poorer coverage by NodeBs. Since personal base stations can be deployed in an ad hoc manner and share the same frequency bands, interference mitigation becomes a concern from a resource management position.

As growing numbers of users are wirelessly accessing systems such as the interne and cellular telephone systems, successful and efficient deployment of personal base stations can provide for improved wireless network performance by filling coverage gaps or augmenting deficient coverage areas. In this regard, dynamic resource management for OFDMA-based wireless network components can play a role in performance of these valuable network resources.

SUMMARY

The following presents a simplified summary of the various embodiments of the subject disclosure in order to provide a basic understanding of some aspects described herein. This summary is not an extensive overview of the disclosed subject matter. It is intended to neither identify key or critical elements of the disclosed subject matter nor delineate the scope of the subject various embodiments of the subject disclosure. Its sole purpose is to present some concepts of the disclosed subject matter in a simplified form as a prelude to the more detailed description that is presented later.

An embodiment of the presently disclosed subject matter can include a system that includes at least one wireless radio component. A wireless radio component can be, for example, a femtocell or picocell access point. The wireless radio component can include a subchannel assignment component. The subchannel assignment component can dynamically assign subchannels of a set of subchannels. The wireless radio component can further include a power allocation component. The power allocation component can dynamically allocate power to the subchannels of the set of subchannels.

In a further embodiment, the disclosed subject matter can be in the form of computer-executable instructions stored on a computer-readable storage medium. The computer-executable instructions can include defining a variable as a function of power allocated to a subchannel of a wireless radio component. The computer-executable instructions can further include defining an access variable relating to an accessibility of the subchannel. A function, in terms of the valuation variable and the access variable, can then be solved to determine allocated power and a subchannel assignment.

In another embodiment, the disclosed subject matter can be in the form of a method. The method can include determining a first marginal utility value related to assigning a first subchannel and assigning the first subchannel. The method can continue to determining a second marginal utility value related to assigning a second subchannel and assigning the second subchannel.

In a further embodiment, the disclosed subject matter can be embodied as a system including a means for defining a variable as a function of power allocated to a subchannel of a wireless radio component. The system can further include a means for defining an access variable relating to an accessibility of the subchannel. The system can further include a means for determining allocated power for the subchannel and a subchannel assignment of the subchannel as a function of the valuation variable and the access variable.

The following description and the annexed drawings set forth in detail certain illustrative aspects of the disclosed subject matter. These aspects are indicative, however, of but a few of the various ways in which the principles of the various embodiments of the subject disclosure can be employed and the disclosed subject matter is intended to include all such aspects and their equivalents. Other advantages and distinctive features of the disclosed subject matter will become apparent from the following detailed description of the various embodiments of the subject disclosure when considered in conjunction with the drawings.

BRIEF DESCRIPTION OF THE DRAWINGS

FIG. 8 illustrates exemplary pseudo-code for dynamic resource management for wireless network components in accordance with an aspect of the disclosed subject matter.

DETAILED DESCRIPTION

Figure 1:
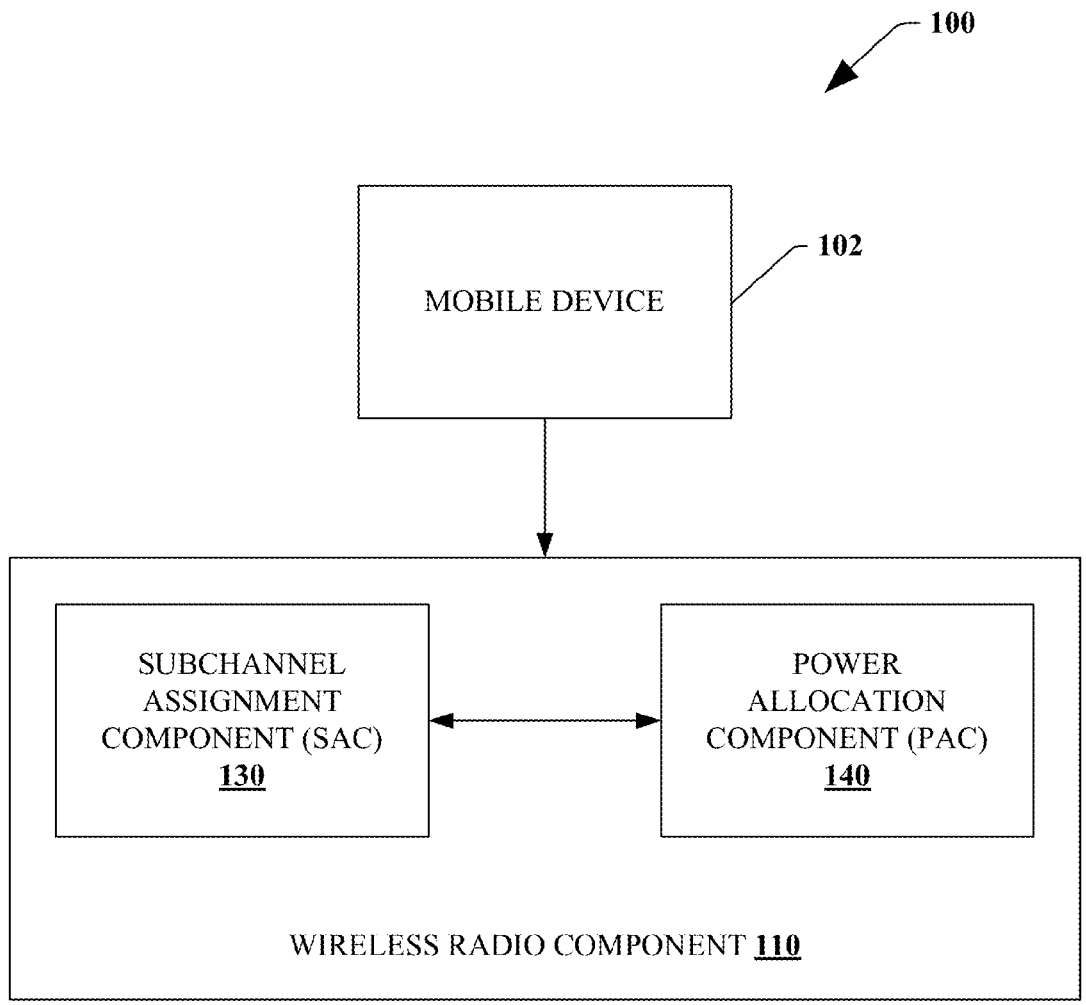
FIG. 1 is a diagram of a system that can facilitate dynamic resource management for wireless network components in accordance with an aspect of the subject matter disclosed herein.

In OFDMA-based networks, radio spectrum is divided into parallel subchannels that can be assigned to different users, e.g., requestors. Where a plurality of requestors accesses a subchannel simultaneously in overlapping coverage regions, interference can degrade the subchannel and affect the data carrying capacity thereof. As such, various techniques have previously been employed to reduce interference with OFDMA subchannels. An example of these conventional techniques can include spatially manipulating wireless network components such that, at predetermined power levels, the coverage areas of each subchannel for a particular wireless network component don't overlap the coverage area of the same subchannel of another wireless network component. This has a distinct disadvantage in that the coverage areas need to be determined to reduce the likelihood of overlap and resulting interference.

Dynamic resource management for wireless network components, as disclosed herein, can employ the assignment of subchannels to a requestor and the allocation of transmission power for assigned subchannels in a manner that serves to optimize OFDMA resources. In an aspect, the general goal of subchannel assignment is to assign each piece of wireless radio resource to the most suitable requestor. The resource allocation methods in conventional literature, generally only consider the interference from other cells and, as such, treat the base station being a victim, but neglect the inference caused by the users to other base stations, e.g., where the users would be considered as aggressors. While this is quite reasonable for traditional cellular networks with proper cell-planning in which adjacent cells use different sub-bands, in networks employing personal base stations, the consideration of aggressive behavior can be useful in determining transmission power level allocation where adjacent personal base stations share the same spectrum. Further, user diversity can be exploited to mitigate interference by considering the interference condition of local and neighboring personal base stations.

For simplicity and clarity, it can be assumed that separated channels are assigned to carrier level network components, e.g., base stations, and to personal level network components, e.g., femtocells, picocells, etc. (hereinafter simply "fAP"), such that interference comes only from neighboring fAP but not from macro level BSs. As used herein, the term "optimized' is used inclusively to indicate some level of optimization up to and including, but not limited to, an ideal optimization (e.g., an optimized result can be less optimal than an ideally optimized result). Exemplary numerical and simulation results demonstrate the validity of the disclosed subject matter. Thus, dynamic resource management for wireless network components can provide improved deployment of OFDMA subchannels.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter can be practiced without these specific details. In other instances, well-known structures and devices are illustrated in block diagram form in order to facilitate describing the various embodiments of the subject disclosure.

Turning to the figures, FIG. 1 illustrates a system 100 that can facilitate dynamic resource management for wireless network components in accordance with an aspect of the subject matter disclosed herein. System 100 can include mobile device 102. Mobile device 102 can request wireless resources from wireless radio component 110. In an aspect these wireless resources can be OFDMA subchannels. Wireless radio component 110 can be a personal base station, e.g., femtocell, picocell, etc. Wireless radio component 110 can, in another aspect, be a carrier base station, e.g., a macro-level base station, NodeB, etc. In an aspect, wireless radio component 110 can be communicatively coupled to a network though not specifically illustrated at FIG. 1. This network can be a local network, a regional network, a wide area network, or any other type of network. The network can carry data, voice, or combinations thereof, among other types of information. The network can be wired, wireless, or a combination thereof. Also of note, wireless radio component 110 can be one of a plurality of the same, or similar, wireless radio components included in the network, though not illustrated for clarity and brevity. Of further note, the network can comprise any number or other network components to facilitate communicative coupling over the network.

Wireless radio component 110 can further comprise subchannel assignment component (SAC) 130 and power allocation component (PAC) 140. SAC 130 and PAC 140 can be communicatively coupled. In a further aspect, SAC 130 and PAC 140 can be a single component (not specifically illustrated) without departing from the present disclosure. SAC 130 can facilitate dynamic management of OFDMA subchannels associated with one or more wireless radio component 110. In an aspect, SAC 130 can dynamically select a subchannel in response to a request for a subchannel. The request for a subchannel can be related to assigning a subchannel to facilitate a communicative coupling between mobile device 102 and wireless radio component 110. Similarly, PAC 140 can facilitate dynamic management of OFDMA subchannels associated with one or more wireless radio component 110. PAC 140 can dynamically allocate power to subchannels to facilitate transmission of information on the subchannel. In an aspect, PAC 140 can increase power on a subchannel to facilitate improved communication on a subchannel. In a further aspect, PAC 140 can decrease power on a subchannel to reduce the likelihood of interference with subchannels.

Figure 2:
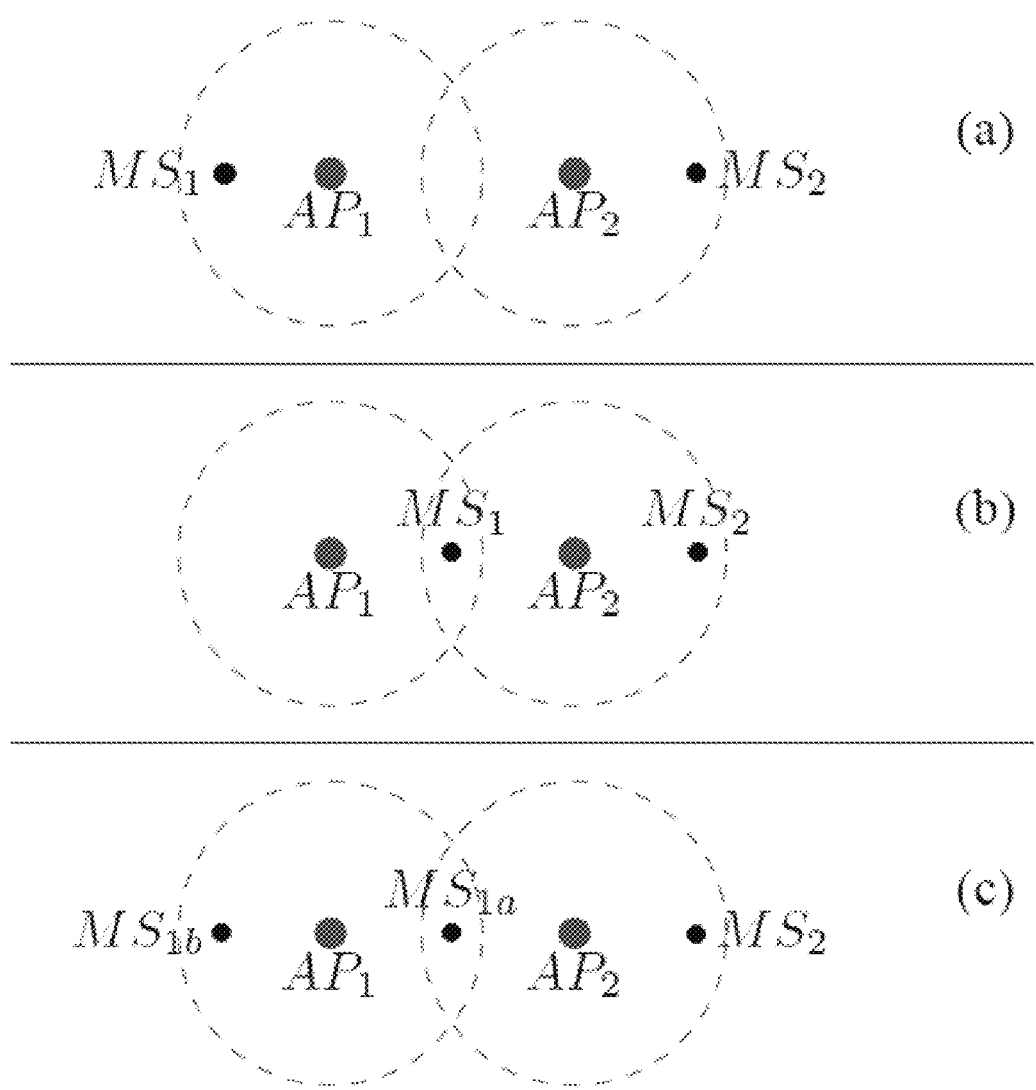
FIG. 2 illustrates exemplary user diversity employed in dynamic resource management for wireless network components in accordance with an aspect of the disclosed subject matter.

FIG. 2 is an exemplary illustration of user diversity that can be related to dynamic resource management for wireless network components in accordance with an aspect of the disclosed subject matter disclosed herein. Part (a) of FIG. 2 illustrates two access points, AP1 and AP2, and their corresponding overlapping coverage areas, designated by the dotted lines. A first mobile subscriber, MS1 is located in the coverage area of AP1 and a second mobile subscriber, MS2, is located in the coverage are of AP2. Given the spatial relationships of part (a), even when both AP1 and AP2 employ the same subchannels for communication with MS1 and MS2 respectively, there will be no interference on the subchannels because MS1 is out of range of AP2 and MS2 is out of range of AP1.

In contrast to part (a), at part (b) of FIG. 2, MS1 is now located in the overlapping coverage region of both AP1 and AP2. MS2 remains only in the coverage are of MS2. The spatial relationships illustrated at part (b) would be problematic where both AP1 and AP2 are employing the same subchannels for communications with MS1 and MS2. Where MS2 is out of the coverage area of AP1, information transmitted by AP1 on the same subchannel as employed by AP2 would not reach MS2. However, information transmitted by AP1 and AP2 would be received by MS1 where it is within the coverage area of both access points. This can be a cause of interference in the communication between MS1 and AP1. This interference can be cured by ensuring that AP1 and AP2 use different subchannels when a mobile subscriber is located in the overlapping coverage area. Restricting AP1 and AP2 to different subchannels reduces the maximum possible communication bandwidth for the access points. As a non-limiting example, if AP1 uses half of the available subchannels and AP2 uses the other half of the available subchannels, the maximum bandwidth is also about half for each of the access points as compared to having access to all of the available subchannels (as would be possible at part (a)). Selection of subchannels for use at each access point can be facilitated by communicative coupling between the access points.

The addition of an additional mobile subscriber does not always require further dilution of the available bandwidth. At part (c) of FIG. 2, a third mobile subscriber is introduced, MS1$b$, while the mobile subscriber located in the overlapping coverage area is relabeled MS1$a$. Communication with MS1$b$ and MS2, similar to that of part (a), can occur on any subchannel because they are not located in the overlapping portion of the coverage areas of AP1 and AP2. However, communication between AP1 and MS1$a$ should occur on subchannels not employed by AP2 to reduce the likelihood of interference from AP2 signals. As such, AP1 and AP2 can selectively employ separated subchannels, as in part (b), for communications with MS1$a$ and MS2, respectively, while AP1 can further employ the any subchannel that does not interfere with communications to MS1$a$, for communication with MS1$b$. This improved spectral efficiency can be termed user diversity or multi-user diversity.

Figure 3:
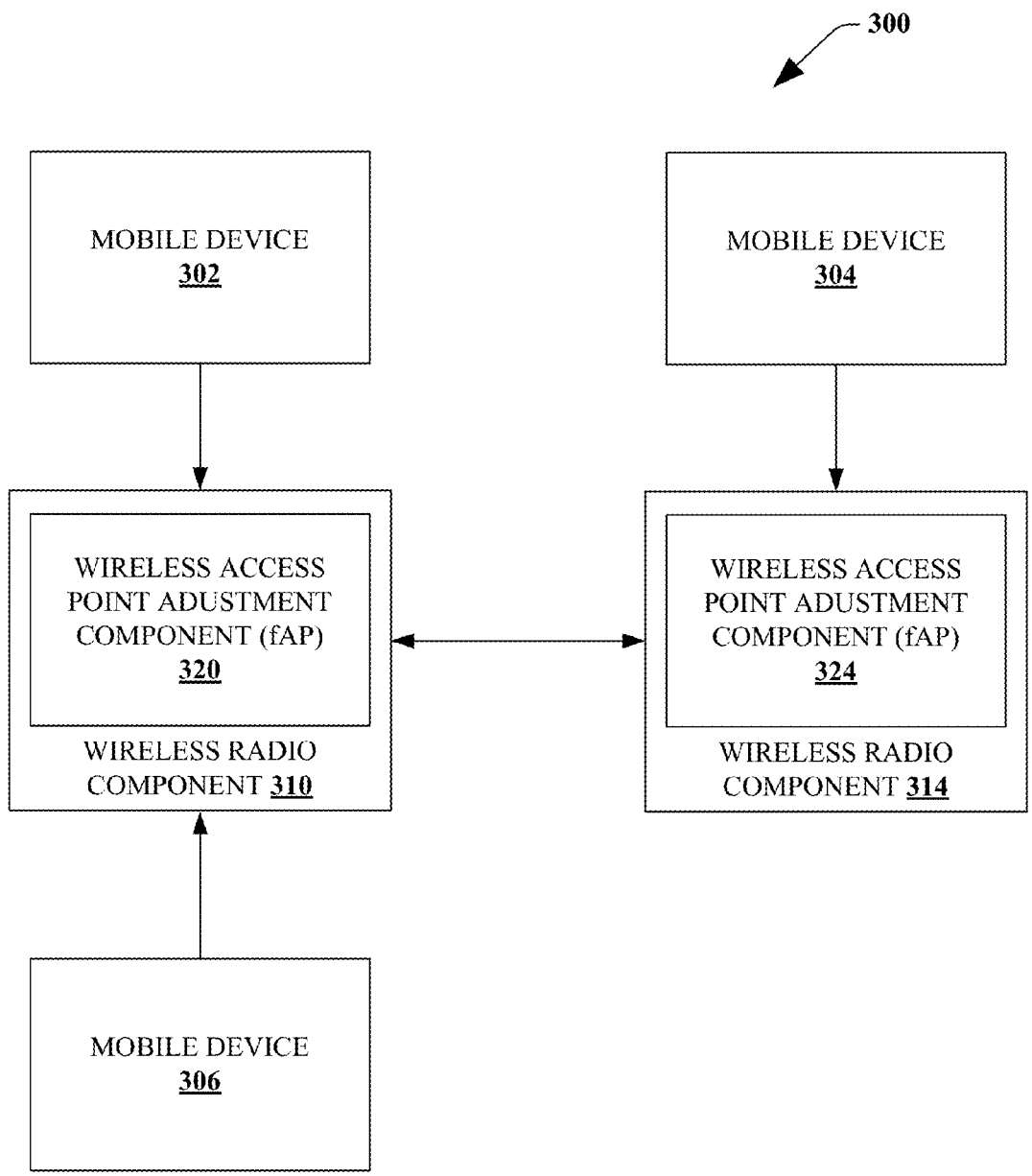
FIG. 3 is a diagram of a system having a plurality of wireless radio components that can facilitate dynamic resource management for a plurality of wireless network components in accordance with an aspect of the subject matter disclosed herein.

Turning now to FIG. 3, presented is a diagram of a system 300 that can facilitate dynamic resource management for a plurality of wireless network components in accordance with an aspect of the subject matter disclosed herein. System 300 can include a plurality of wireless radio components, 310 and 314. It will be noted that system 300 can include any number of wireless radio components, though only two are illustrated for clarity and brevity. Wireless radio component 310 can include wireless access point adjustment component (fAP) 320. Wireless radio component 314 can include wireless access point adjustment component (fAP) 324. In an aspect, a fAP, e.g., 320 or 324, can include a subchannel assignment component that can be the same as, or similar to, SAC 130. In a further aspect, a fAP, e.g., 320 or 324, can include a power allocation component that can be the same as, or similar to, PAC 140.

System 300 can include a plurality of mobile devices, 302, 304, 306, communicatively coupled to the wireless radio components, e.g., 310 and 314. As illustrated, system 300 can include mobile devices 302 and 306 communicatively coupled to wireless radio component 310 and mobile device 304 communicatively coupled to wireless radio component 314. Further, one or more of the wireless radio components of the plurality of wireless radio components can be communicatively coupled with one or more other wireless radio components. System 300 illustrates wireless radio component 310 communicatively coupled to wireless radio component 314.

Wireless radio component 310 can dynamically select a first set of subchannels, by employing fAP 320, for communication with mobile device 302. Further, wireless radio component 310 can dynamically select a second set of subchannels, by employing fAP 320, for communication with mobile device 306. The first and second sets of subchannels can be different to reduce the likelihood of interference. Wireless radio component 310 can communicate information about the first and second set of selected subchannels to wireless radio component 314. Wireless radio component 314 can dynamically select a third set of subchannels, by employing fAP 324, for communication with mobile device 304. The third set of subchannels can be different from the first and second sets of subchannels to reduce the likelihood of interference. In a further aspect, the third set of subchannels can dynamically select subchannels in use in the first or second sets of subchannels where they are not likely to cause interference because they conform to spatial conditions where the coverage regions of wireless radio component 310 and wireless radio component 314 don't overlap and contain one of the mobile devices, e.g., 302, 304, or 306, in a manner similar to that disclosed with regard to FIG. 2.

Subchannel Selection and Power Allocation

Each fAP can dynamically select subchannel assignment and transmission power control for each communicative coupling with a requestor. In an aspect, the decisions, including the required computations, can be formed by the fAP. In a further aspect, information exchange among a plurality of fAP comprising at least part of a network is allowed, so that each fAP can receive information about the other fAP in the network, particularly neighboring fAP that would be spatially predisposed to interference resulting from using the same subchannels. This information can include power allocation, interference condition, and/or subchannel assignment information. In one particular aspect, the resource allocation associated with dynamic resource management for wireless network components, for example, can be treated as an auction model, that is, a subchannel can be treated as item for bidding, and a requestor for a subchannel as a bidder. The design of this exemplary auction problem can fall into game theory, wherein the goal is to generate optimized dynamic management results. More specifically, the exemplary auction model can be a combinatorial auction problem in which each bidder, e.g., requestor, can be assigned a combination of subchannels such that the value, e.g. total throughput, can be maximized.

Let $x_{i,k}$ be a binary variable which equals one if bidder i is accessible to subchannels k, and zero otherwise. Let $v_i(p_{i,k}, p_{-i,k})$ be the valuation of the requestor i, with regard to subchannel k, where $p_{-1,k} = [p_{1,k}, \ldots, p_{i-1,k}, p_{i-1,k}, \ldots, p_{N,k}]$. As a function of allocated power, the valuation can be defined as the Shannon capacity:

$$v_i(p_{i,k}) = \log\left(1 + \frac{p_{i,k} h_{i,i,k}}{I_{i,k} + \sigma_n^2}\right) \quad (1)$$

where $I_{i,k} = \sum_{j \neq i} p_{j,k} h_{i,j,k}$ is the total interference power measured by requestor i on subchannel k;

$p_{i,k}$ is the power allocated by requestor i on subchannel k;

$h_{i,j,k}$ is the channel gain between transmitter of a link j and receiver of a link i;

$\sigma_n^2$ is the thermal noise power level.

Then the global optimization problem can be formulated as:

$$\text{maximize} \sum_i \sum_k x_{i,k} v_i(p_{i,k}; p_{-i,k})$$

$$\text{subject to} \sum_k p_{i,k} \leq P_{max} \forall \text{ user } i$$

$$\sum_{i \in U_n} x_{i,k} \leq 1 \ \forall \ \text{subchannel } k, fAP \ n$$

$$x_{i,k} \in \{0, 1\}$$

where $U_n$ is the set of requestors, e.g., users, served by the $n^{th}$ fAP, e.g., fAP n. This integer programming problem can be solved by first allowing fractional values of x*, then finding optimal fractional values by solving the linear program, and then transforming the solution into integer values by a tie-breaking method. This process can be computationally intensive and as such is not disclosed in further detail for clarity and brevity. Moreover, where the number of requestors/users and tones involved in each tie can be large, the computation becomes correspondingly more intensive. Thus, the present disclosure includes disclosure relating to alternative computational approaches that split the optimization problem in to two parts, a subchannel assignment (SA) portion and a power allocation (PA) portion. It will be noted that the two parts, e.g., SA and PA, are intertwined and may not be executed in a totally separated manner, however, iterative adjustment can be employed in computing by the alternative computational approaches.

Each requestor, e.g., user, seeking to access one or more subchannels can feasibly access a given set of subchannels, said set is determined in a subchannel assignment portion. Power allocation can be done in a game theory manner, as previously disclosed, and can be executed by each individual fAP, as follows: Let the set of assigned subchannels to requestor/user i be $S_i$. The optimization problem to maximize the total capacity of the system then can be:

$$\text{maximize} \sum_i \sum_{k \in S_i} v_i(p_{i,k}; p_{-i,k})$$

$$\text{subject to} \sum_{k \in S_i} p_{i,k} \leq P_{max} \forall \text{ user } i$$

with the Lagrangian, $$J = \sum_i \sum_k v_i(p_{i,k}; p_{-i,k}) - \sum_i \lambda_i \left(\sum_k p_{i,k} - P_{max}\right) \quad (2)$$

An optimized power allocation $p_{i,k}$ can then be found by differentiating J with respect to $p_{i,k}$, and letting the result be zero:

$$\frac{\partial J}{\partial p_{i,k}} = \frac{\partial v_i(p_{i,k})}{\partial p_{i,k}} + \sum_{j \neq i} \frac{\partial v_j(p_{i,k})}{\partial p_{i,k}} - \lambda_i = 0 \quad (3)$$

$$\Rightarrow \frac{\partial v_i(p_{i,k})}{\partial p_{i,k}} - \sum_{j \neq i} \frac{h_{i,j,k} p_{j,k} h_{i,i,k}}{I_{j,k}(I_{j,k} + p_{j,k} h_{i,i,k})} - \lambda_i = 0$$

Where personal base stations, e.g., femtocells, are employed in networks, these networks are often constructed dynamically and in a haphazard manner. That is to say, in contrast to macro level base stations, e.g., carrier base stations, that are often deployed in a highly planned manner with well understood parameters for coverage are overlap, attenuation, and expected usage, personal level base stations can be deployed with nearly no planning whatsoever. As an example, a new tenant in an office building could easily add several new femtocells within meters of a well established set of femtocells, and such newly deployed femtocells could easily cause significant interference with the previous channel and power allocations of the existing femtocell network. As such, channel selection and/or power allocation can be done in a decentralized manner. Utility functions for individual requestors, e.g., individual mobile devices/users, can maximize utility dynamically. The Nash equilibrium can be reached where a set of solutions are found for the utility functions. The utility function can be designed as quasi-linear, e.g., in the form of $u_{i,k} = v_{i,k} - t_{i,k}$, where $t_{i,k}$ is the price of allocation power $p_{i,k}$. Then set $$t_{i,k} = \sum_{j \neq i} \alpha_{i,j,k} h_{i,j,k} p_{i,k} \quad (4)$$

where $\alpha_{i,j,k}$ is called the pricing factor, and observe that $h_{i,j,k} p_{i,k}$ is the interference power caused by user i to the BS of user j, if user i and j share subchannel k. As such, a transmitter is 'charged some price' for each link with which it interferes, and that price is proportional to the level of interference, e.g., interference power.

The individual problem for user i can now be formulated so as to maximize the utility of user i:

$$\text{maximize} \sum_{k \in S_i} v_i(p_{i,k}) - \sum_{k \in S_i} p_{i,k} \sum_{j \neq i, k \in S_j} \alpha_{i,j,k} h_{i,j,k}$$

$$\text{subject to} \sum_{k \in S_i} p_{i,k} \leq P_{max}$$

And the Lagrangian for link i:

$$J_i = \sum_{k \in S_i} v_i(p_{i,k}) - \sum_{k \in S_i} p_{i,k} \sum_{j \neq i, k \in S_j} \alpha_{i,j,k} h_{i,j,k}$$
$$- \lambda_i \left( \sum_{k \in S_i} p_{i,k} - P_{max} \right)$$

with the optimal condition:

$$\frac{\partial J_i}{\partial p_{i,k}} = \frac{\partial v_i(p_{i,k})}{\partial p_{i,k}} - \sum_{j \neq i} \alpha_{i,j,k} h_{i,j,k} - \lambda_i = 0$$

Generally speaking, the Nash equilibrium doesn't always mean a true optimum, as disclosed hereinabove. However, by comparing the above equation with Eq. 2, we have:

$$\alpha_{i,j,k} = \frac{h_{j,j,k} p_{j,k}}{I_{j,k}(I_{j,k} + h_{j,j,k} p_{j,k})} = \alpha_{j,k} \quad (5)$$

$$p_{i,k}^* = \left( \frac{1}{a_{i,k} + \lambda_{j,k}} - \frac{h_{i,i,k}}{I_{i,k}} \right)^+ \quad (6)$$

Where, of note, the pricing factor is independent from i. As such, at each iteration, the pricing factor information can be shared among communicatively coupled fAPs, representing the current interference conditions.

FIGS. 4-7 illustrate methods and/or flow diagrams in accordance with the disclosed subject matter. For simplicity of explanation, the methods are depicted and described as a series of acts. It is to be understood and appreciated that the various embodiments of the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states by way of state diagram or events. Additionally, it should be further appreciated that the methods disclosed hereinafter and throughout this specification are capable of being stored on an article of manufacture to facilitate transporting and transferring such methods to computers. The term article of manufacture, as used herein, can encompass a computer program accessible from any computer-readable device, carrier, or media.

Figure 4:
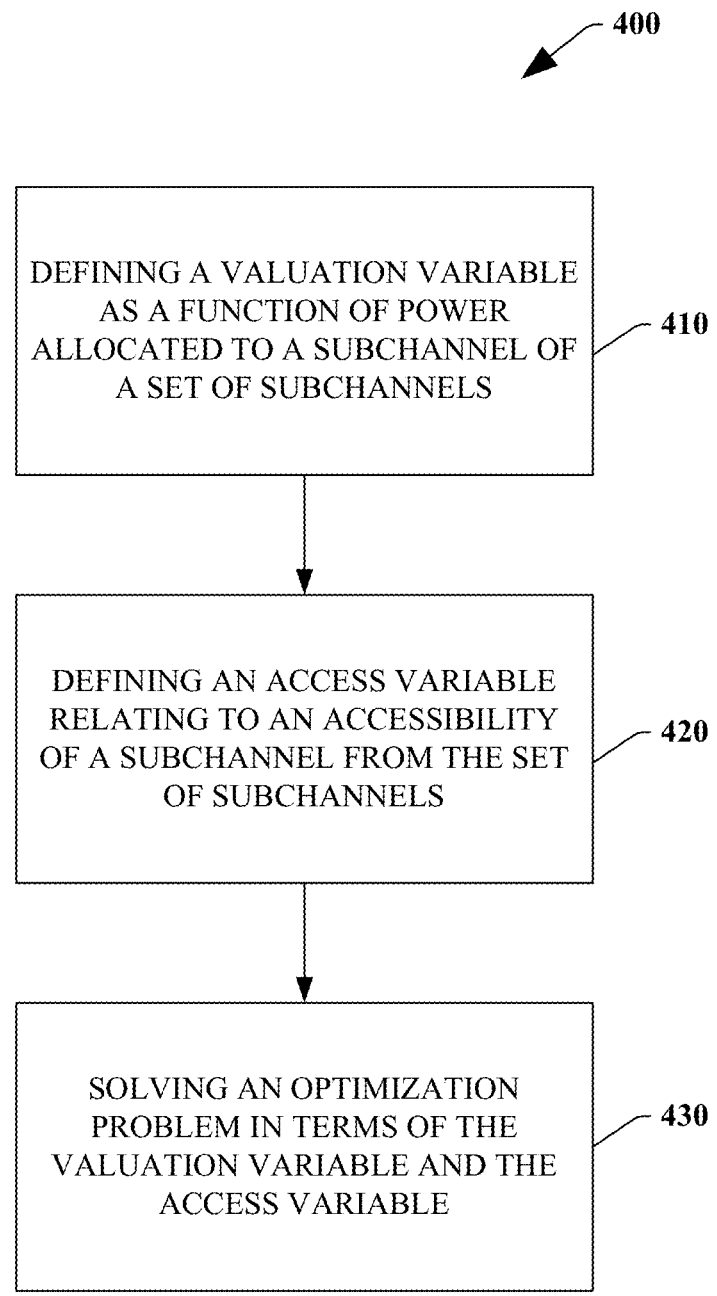
FIG. 4 illustrates a method that facilitates dynamic resource management for wireless network components in accordance with an aspect of the disclosed subject matter.

FIG. 4 illustrates a method 400 that facilitates dynamic resource management for wireless network components in accordance with an aspect of the disclosed subject matter. At 410 a valuation variable is defined as a function of power allocated to a subchannel of a set of subchannels. As such, a greater value can be associated to allocation of a power level that sufficiently exceeds background thermal noise and interference power. In one aspect, the valuation variable can be the same as, or similar to, $v_i(p_{i,k})$ as found in Eq. 1.

At 420, an access variable can be defined relating to the accessibility of a subchannel to a requestor. The access variable can be binary, such that the value is 1 when the subchannel is accessible and 0 when the subchannel is not accessible. In an aspect, the valuation variable can be the same as, or similar to, $x_{i,k}$ as disclosed hereinabove.

At 430, an optimization problem can be solved in terms of the valuation variable and the access variable. At this point method 400 can end. The optimization problem can be exhaustively solved by first allowing fractional values in place of the binary access variable, then finding optimal fractional values by solving the resulting linear equations, and then transforming the solutions back into integer values by applying tie-breaking methods. As previously disclosed, this process can be computationally intensive and alternative computational solution that are less rigorous are explored further herein for the sake of clarity and brevity. In an aspect, the optimization problem can be to maximize $\Sigma_i \Sigma_{k \in S_i} v_i(p_{i,k}; p_{-i,k})$, as disclosed hereinabove.

Figure 5:
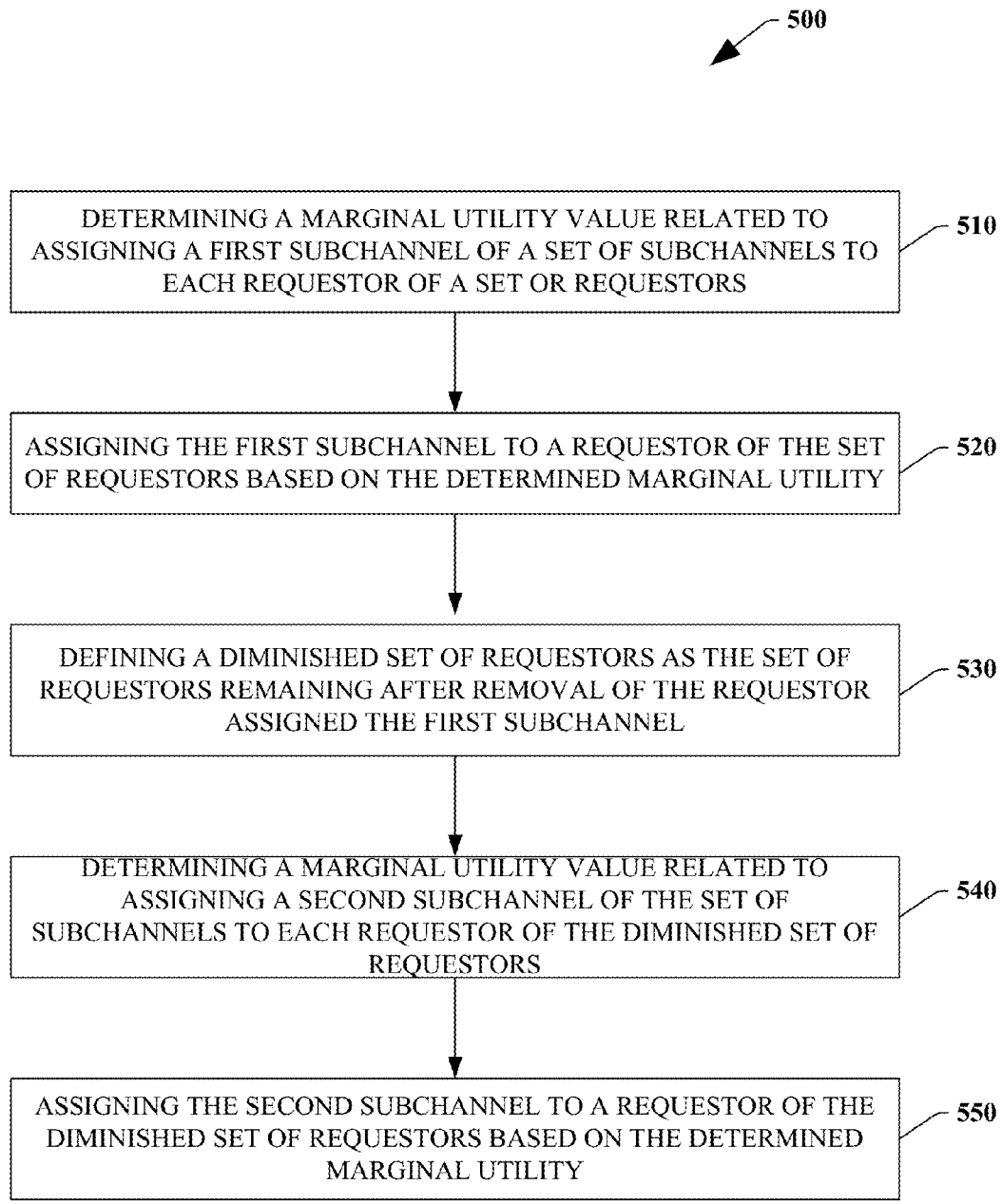
FIG. 5 illustrates a method that facilitates dynamic resource management for wireless network components in accordance with an aspect of the disclosed subject matter.

FIG. 5 illustrates a method 500 that facilitates dynamic resource management for wireless network components in accordance with an aspect of the disclosed subject matter. At 510, a marginal utility value can be determined relating to assigning a first subchannel to each requestor of the subchannel. This marginal utility value can represent the value to each requestor of being assigned the first subchannel. As an example, where there are two requestors, the marginal value may be determined for each of the two channels. A comparison of the two determined marginal values can, for example, illustrate a greater marginal value for the second requestor. As such, the subchannel can be assigned to the second requestor wherein maximizing value is a goal.

At 520, the first subchannel can be assigned to a requestor of the set of requestors. This assignment can be based on the determined marginal utility from 510. As illustrated in the previous example, where the marginal value for the second requestor was greater than the marginal value determined for the first requestor for the same subchannel, it is logical to assign the subchannel to the second requestor where maximizing value is a predetermined objective. In an aspect this can be viewed as a greedy method in that after the marginal value is determined for each requestor seeking to be assigned the first subchannel, one of the requestors is assigned the subchannel based on the determined marginal values.

At 530, a diminished set of requestors can be defined. The diminished set of requestors can be the set of requestors without the requestor that was assigned the first subchannel at 520. That is, as a requestor is assigned a subchannel, the requestor is removed from the diminished set.

At 540, a marginal utility value can be determined relating to assigning a second subchannel to each requestor from the diminished set of requestors. Determining the marginal utility value at 540 can be the same as, or similar to, determining the marginal utility value at 510 except for a diminished set of requestors.

At 550, the second subchannel can be assigned to a requestor of the diminished set of requestors. At this point, method 500 can end. The assignment can be based on the determined marginal utility value from 540. The assignment can be the same as, or similar to, the assignment done at 520 except for the second subchannel and for the diminished set of requestors.

In an aspect, method 500 can be expanded by iteratively diminishing the set of requestors, determining marginal utility values for further subchannels, and assigning those subchannels based on the corresponding iteration of the marginal utility values. It is to be noted that this iterative process can assign subchannels to each requestor in a set of requestors in order of diminishing marginal utility value (where there are more subchannels than requestors). Method 500 can facilitate assigning subchannels to requestors having the most to gain by being assigned a particular subchannel.

Figure 6:
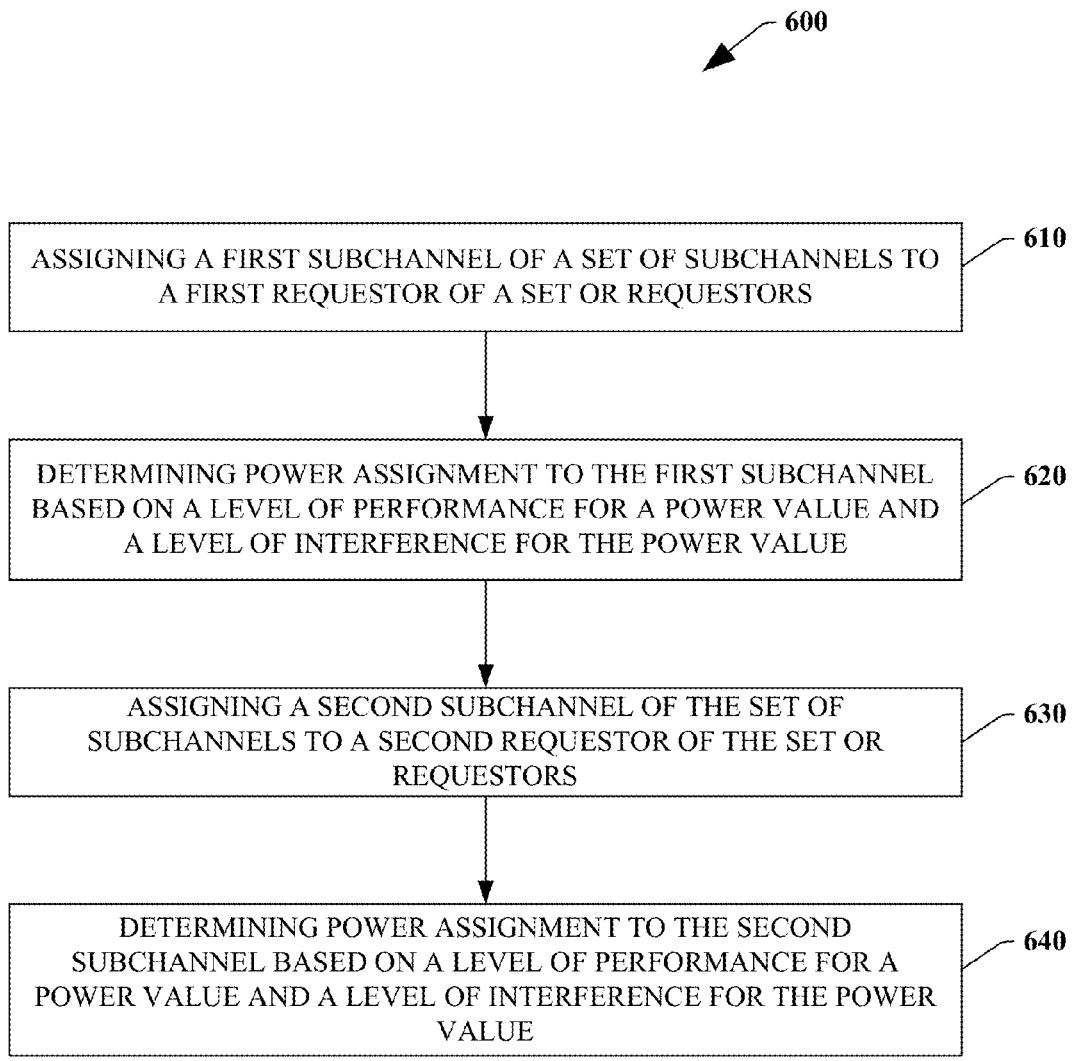
FIG. 6 illustrates a method that facilitates dynamic resource management for wireless network components in accordance with an aspect of the disclosed subject matter.

FIG. 6 illustrates a method 600 that facilitates dynamic resource management for wireless network components in accordance with an aspect of the disclosed subject matter. At 610, a first subchannel can be assigned to a first requestor of a set of requestors.

At 620, a power level assignment can be determined for the first subchannel. This power level can be based on a level of performance for the power level and a correlated level of interference for assigning the power level. In an aspect, the determined power can consider the benefit of a high power level to range and signal to noise ratios (SNR) and also consider the disadvantages of a high power level that can interfere with neighboring users of the subchannel. As stated herein above, method 600, at 620, can consider allocating a power level as both an aggressor and a victim. As a non-limiting example, allocating a high power level to the subchannel can provide excellent range and a high SNR while also causing a high level of interference with other users of the subchannel. As a second non-limiting example, allocating a low power level can cause minimal interference with other users of the subchannel but can also result in limited range and a low SNR. As such, a power level can be dynamically allocated that satisfies both performance and interference concerns for the given conditions of the subchannel, requestors, and network. As an example, where there are no neighboring fAPs that employ the first assigned subchannel, a high level of power can be allocated to provide great SNR and range without concern about interference because the first subchannel is not also being used in close proximity.

At 630, a second subchannel can be assigned. At 640, the power level for the second subchannel can be determined. At this point method 600 can end. Method 600 illustrates less rigorous selection and assigning of subchannels as compared, for example, to method 500, while compensating for the less nuances selection process by allocation of power levels that are considerate of both the utility and interference associated with the possibility of assigning the same subchannel to neighboring fAPs.

It is to be noted that assigning subchannels is done on a per fAP basis, e.g., each fAP can have the same set of subchannels. However, it is to be further noted that method 600 can consider interference levels for other fAPs in a network, particularly where the fAPs in a network are communicatively coupled, such as illustrated in system 300. In an aspect, method 600 can rapidly assign subchannels with a level of impunity in that the allocated power levels of the assigned subchannels can specifically consider the impact of transmissions on the same subchannel on neighboring fAPs.

Figure 7:
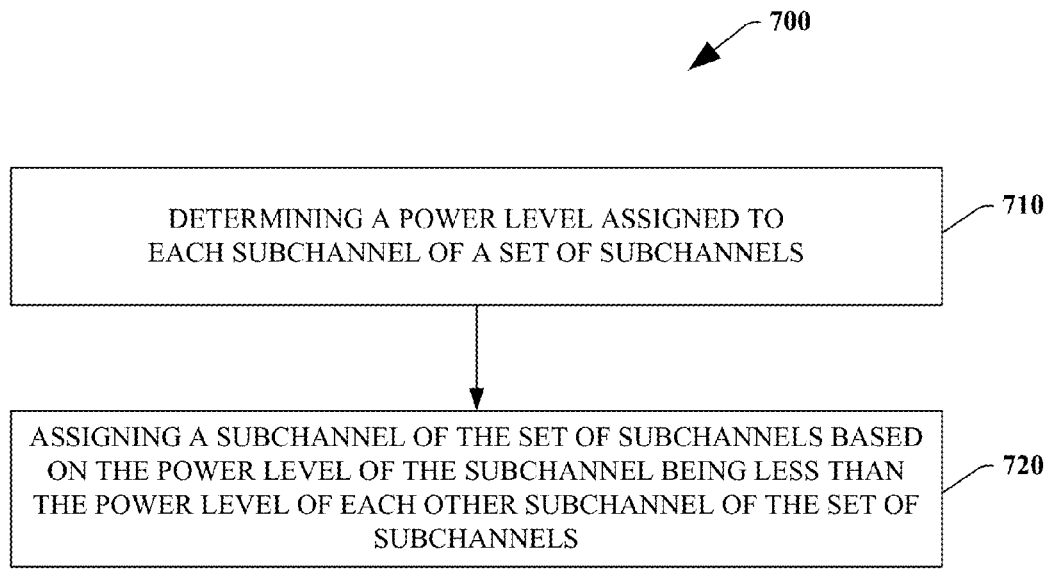
FIG. 7 illustrates a method that facilitates dynamic resource management for wireless network components in accordance with an aspect of the disclosed subject matter.

FIG. 7 illustrates a method 700 that facilitates dynamic resource management for wireless network components in accordance with an aspect of the disclosed subject matter. At 710, a power level can be determined for each subchannel of a set of subchannels. At 720, a subchannel of the set of subchannels can be assigned to a requestor. At this point method 700 can end. The assignment of the subchannel can be based on the power level of the subchannel in comparison to other subchannel power levels. In an aspect, where a subchannel at a first fAP is lightly used, the subchannel can have a low power level allocated to it. This same subchannel can be employed at a second fAP specifically because the low power level of the subchannel on the first fAP is less likely to cause interference in the use of the subchannel on the second fAP. Method 700 can be described as assigning subchannels to requestors that are least heavily used by neighboring fAPs.

FIG. 8 illustrates exemplary pseudo-code 800 for dynamic resource management for wireless network components in accordance with an aspect of the disclosed subject matter. Pseudo-code 800 illustrates determining a power level for a subchannel for each fAP in the network. Whereas each fAP can designate a different power level for the subchannel, as disclosed herein, these values can be employed in subchannel assignment. The determined power levels for the subchannel are then communicated to other fAPs in the network. This facilitates each fAP of the network having information regarding the power levels allocated to the subchannel at each other fAP in the network. The next subchannel can then be considered for each fAP in the network. As pseudo-code 800 iterates, each fAP in the network will become informed about the allocated power level of each subchannel at each fAP in the network. This information can then be leveraged in selecting subchannel assignments for requestors. Optimization, as stated hereinbefore, can be highly computationally intensive and an exhaustive solution can be time consuming. As such, alternate methods can be demonstrated in pseudo-code that can be computed more quickly and provide optimized, if not optimal, results for subchannel assignment and power level allocation.

Figure 9:
FIG. 9 illustrates exemplary pseudo-code for dynamic resource management for wireless network components in accordance with an aspect of the disclosed subject matter.

FIG. 9 illustrates exemplary pseudo-code 900 for dynamic resource management for wireless network components in accordance with an aspect of the disclosed subject matter. Pseudo-code 900 can be a form of a combinatorial auction with greedy algorithm (CAGA). Pseudo-code 900 can be deemed a greedy algorithm in that, at each iteration, a subchannel is assigned to a requestor. One subchannel can be allocated to one requestor in each round of the per-fAP adjustment procedure. This subchannel and requestor can be selected based on which requestor can expect the greatest improvement, wherein improvement is defined as marginal utility:

$$v_i(a_i|S_i) = v(S_i \cup \{a_i\}) - v_i(S_i) \tag{7}$$

Where $S_i$ denotes the allocation to requestor i and $a_i$ is the subchannel index that requestor i seeks to have assigned in a round. The resulting algorithm can be executed by each fAP in a network, where the normalized SINR for requestor i on subchannel k is defined as the signal-to-noise-interference ratio (SINR) with unit receiving power, or $SINR_{i,k}^{norm} = h_{i,k}^2 / (I_k + \sigma_n^2)$ In an aspect, pseudo-code 900 can sort a set of subchannels in decreasing order of normalized SINR. Pseudo-code 900 updates a marginal utility value of a subchannel for each requestor. The subchannel is then assigned to the requestor having the greatest marginal utility value for the channel at that iteration. Ties are broken arbitrarily. Pseudo-code 900 iterates through the set of subchannels, such that each subchannel is assigned to a requestor that valued the resource more than other requestors at a particular iteration. In an aspect, pseudo-code 900 can be similar to method 500. Of note, in a flat fading channel, the capacity, as a function of allocated bandwidth, increases with decreasing marginal utility. This property holds for frequency selective channels, if the subchannels are sorted in decreasing order of SINR. It can be shown that the resulting capacity of each fAP is at least half of the optimal value. This algorithm runs in polynomial time.

While the CAGA provides the resulting capacity of each fAP is at least half of the optimal value, it is still computationally complexity, though less so than for pseudo-code 800. Separating the subchannel assignment and power allocation phases by first fixing the subchannel assignment and then executing game-theoretic power adjustment can provide for less computationally intense processes. Of note, by fixing the subchannel assignment, for each new requestor, the serving fAP and neighboring fAP can adjust power iteratively, but an 'auction' procedure is not involved and no iteration is needed for subchannel assignment because it is fixed at the initialization stage. One fixed subchannel assignment is Random Equal Subchannel Partition (RESP). For each fAP running RESP, in the SA phase, the subchannels can be randomly permuted and equally divided to the requesters served by the fAP. In the PA phase, the per fAP adjustment procedures becomes:

$$p_i^{(l)} = BR_i(p_i^{(l-1)}, \ldots, p_{i-1}^{(l-1)}, p_{i+1}^{(l-1)}, \ldots, p_N^{(l-1)}),$$

where $BR_i$ represents the best response of user i which corresponds to the power allocation shown in Eq. 6.

As a further simplifying alternative optimization technique, intercommunication between fAPs in network can be ignored in favor of strictly local adjustments to the SA and PA. A first example can be a Local Combinatorial Auction (LCA) Method. The LCA method can employ almost the same algorithm as in the CAGA method disclosed hereinabove, e.g., pseudo-code 900. In the LCA method, for each requestor a local marginal utility value of a subchannel is determined. The subchannel is then assigned to the requestor having the greatest marginal utility value for the channel at that iteration. Power allocation is done using traditional water-filling algorithm. It can be imagined that the LCA method results in poorer performance than the CAGA method in that the fAP with a new requestor generates new interference to neighboring fAP, while there is no corresponding correction for this new interference at the victim fAP because the information is never communicated to the victim fAP as would be done in the CAGA method.

A second example of local adjustment can be the Neighbors' Poor Channels (NPC) Method. The NPC method can include assigning to each user the subchannels in which its neighbor allocates the least power resources. It can be assumed that if a neighboring fAP allocates less power in a subchannel, then there is a lower preference for this subchannel, such that the transmission power on that subchannel in a serving fAP generates less interference to its neighbors. As an example, for each subchannel k, the maximum power allocated in neighboring fAPs for each requestor, i, can be interrogated, and subchannel k can be assigned to the requestor with the minimum neighbor power. Of note, the neighboring and interference conditions are different for users in the serving fAP and user diversity can still be employed in the NPC method.

Figure 10:
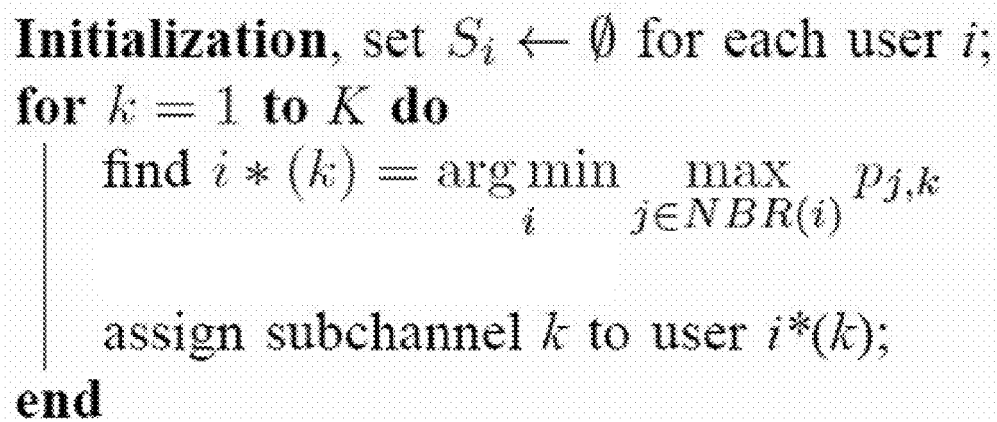
FIG. 10 illustrates exemplary pseudo-code for dynamic resource management for wireless network components in accordance with an aspect of the disclosed subject matter.

Turning now to FIG. 10, illustrated is exemplary pseudo-code 1000 for dynamic resource management for wireless network components in accordance with an aspect of the disclosed subject matter. Pseudo-code 1000 illustrates finding the minimum and maximum allocated power level for each subchannel for a set of neighboring fAPs. This allows a determination of which fAPs is least likely to be involved in interference for the given subchannel. The subchannel can then be assigned to requestors at a fAP that are least likely to cause interference by employing the subchannel. As an example, where a subchannel is assigned to a first fAP but has no power allocated to it because it is unused despite being allocated, it would be unlikely to suffer interference from the same subchannel being assigned to a neighboring fAP. In an aspect, it can be viewed as being analogous to utilizing unused frequency space in cognitive radios, e.g., when a broadcaster isn't actively using the frequency, it does little harm to let other use it until the broadcaster needs the frequency again.

Each of CAGA, RESP, NPC, and LCA can be modeled and numerical results can be obtained demonstrating behaviors of the various methods for given parameters. Numerical results are presented herein for a simulation of a 5×5 room array in a grid pattern deployment of fAPs, in which one fAP is installed in each of the 25 rooms. The rooms are modeled as being 10-by-10 meters in size. Further, system bandwidth is designated as 10 MHz, consisting of 1024 OFDM tones, grouped into 40 subchannels with 18 tones per subchannel, and the remaining tones are used as guard tones.

Further, path loss (PL) in dB for non line-of-sight (NLOS) propagation is given by an indoor small office model. It can be assumed there are light walls between any two rooms and $n_w$ can be the number of walls between any two nodes. Let d be the distance in meters, and f be the carrier frequency in GHz. Thus, path loss can be represented by:

$$PL(d,f) = 46.4 + 20 \log_{10} d + 5n_w + 20 \log_{10}(f/5.0) \quad (8)$$

Shadowing can be modeled by a log-normal random variable $10^{x/10}$, where x is a zero mean Gaussian random variable with standard deviation of 3.1 dB for LOS and 6 dB for NLOS cases. Frequency-selective fading can be simulated by the cluster-delay-line (CDL) model for the selected indoor small office model. In this model, the small-scaled wave propagation behavior is described by 16 clusters with different delay and ray power. Further, a single-input-single-output (SISO) antenna setting is modeled for simplicity. Requester/User arrival is modeled as a Poisson process, and each requestor/user is disconnected after uploading an exemplary file. Behavior is simulated for 30 minutes.

Figure 11:
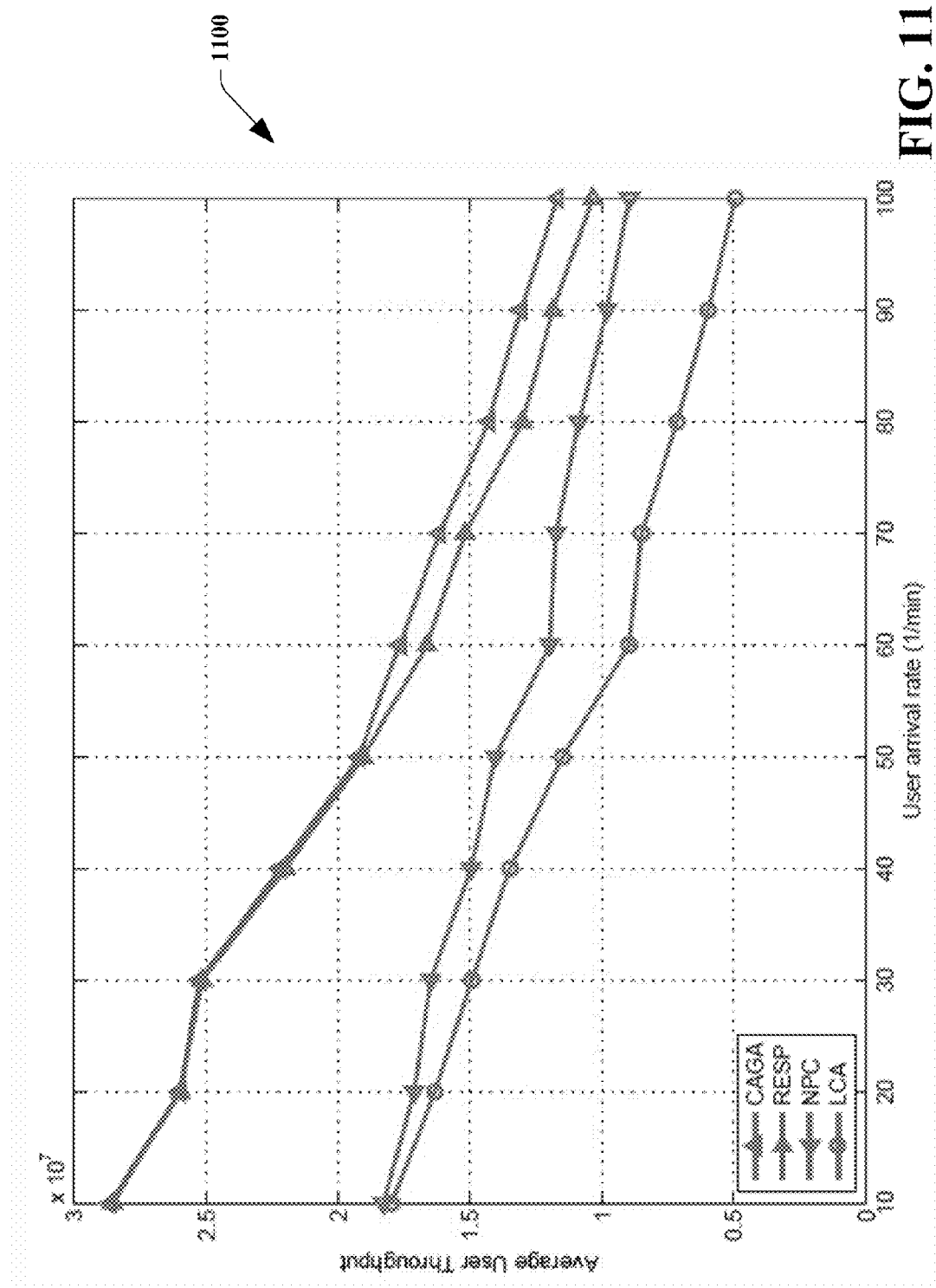
FIG. 11 illustrates results of an exemplary simulation of dynamic resource management techniques for wireless network components in accordance with an aspect of the disclosed subject matter.

FIG. 11 illustrates exemplary simulation results and exemplary numerical results 1100 in accordance with an aspect of the disclosed subject matter. In an aspect, FIG. 11 shows the average user capacity in a dense deployment scheme, in which there is one fAP in each of the 25 small rooms. The two algorithms with iterative power adjustments, i.e., CAGA and RESP, outperform the baseline algorithms. Of note, the RESP algorithm performs slightly below the CAGA algorithm, but does so with much lower complexity and computational load.

Figure 12:
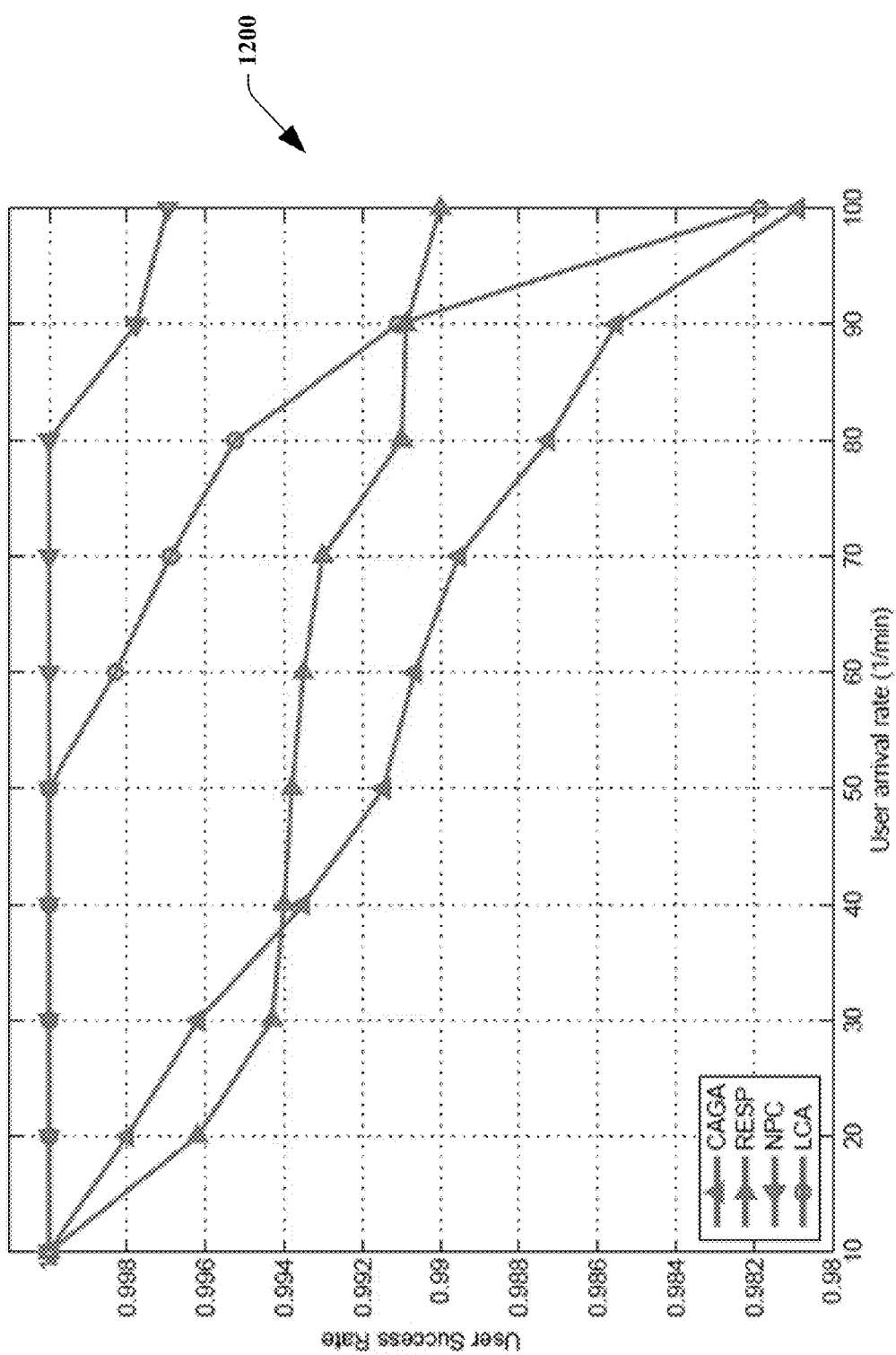
FIG. 12 illustrates results of an exemplary simulation of dynamic resource management techniques for wireless network components in accordance with an aspect of the disclosed subject matter.

FIG. 12 illustrates exemplary simulation results and exemplary numerical results 1200 in accordance with an aspect of the disclosed subject matter. In addition to the average user capacity, the performance of individual users is of concern. As femtocell networks aim at providing high data rate services, a user success probability can be defined as the percentage of requestors/users with capacity higher than 1 Mbps. FIG. 12 shows the requestor/user success probability for different requestor/user arrival rates. It can be shown that the success ratios of the two combinatorial auction style algorithms slightly drop at high user arrival rate, since they both aim at maximizing the total system throughput.

Figure 13:
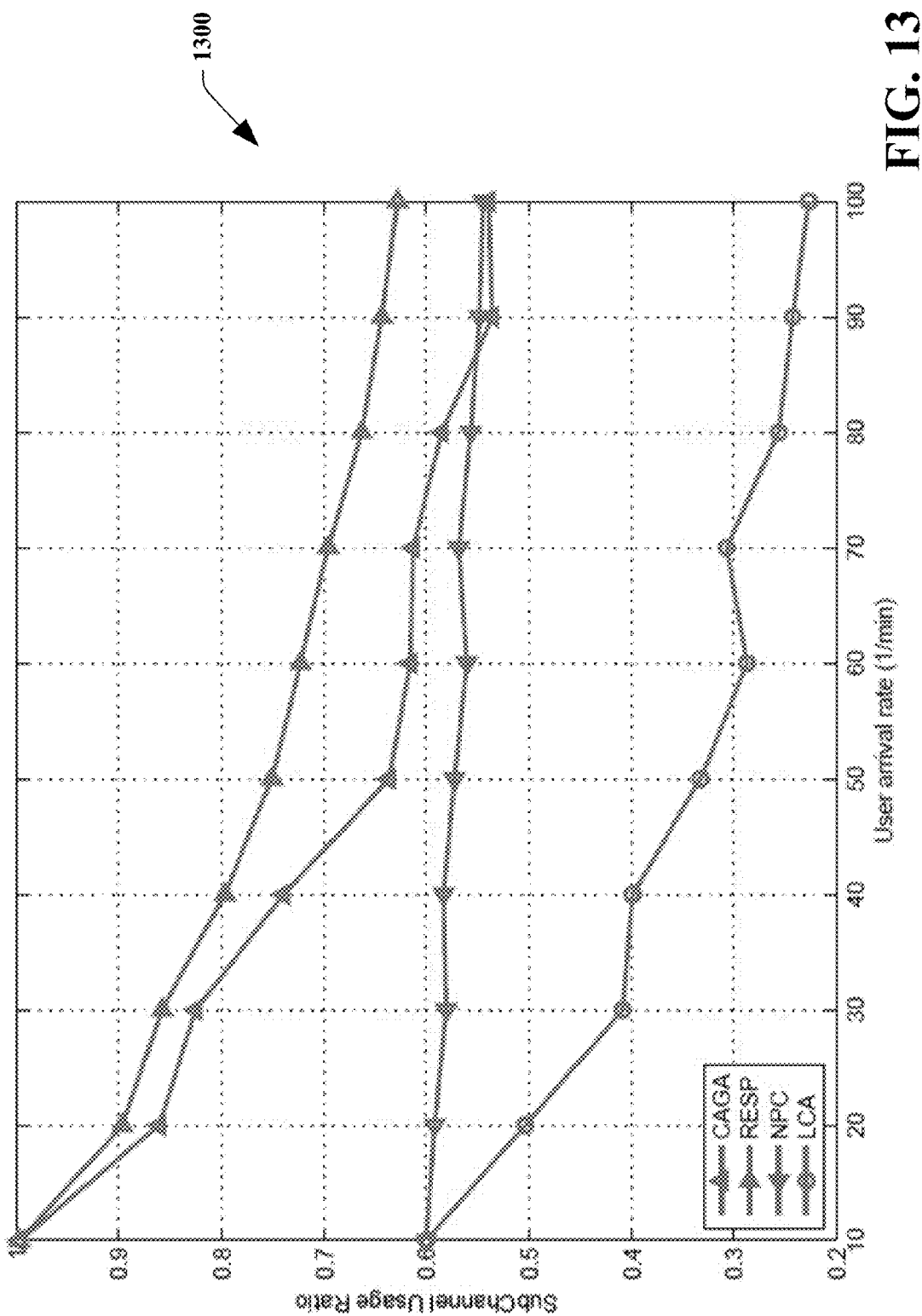
FIG. 13 illustrates results of an exemplary simulation of dynamic resource management techniques for wireless network components in accordance with an aspect of the disclosed subject matter.

FIG. 13 illustrates exemplary simulation results and exemplary numerical results 1300 in accordance with an aspect of the disclosed subject matter. The Shannon capacity formula illustrates that capacity grows linearly with channel bandwidth, and in logarithm with SNR. Although higher subchannel usage ratios do not always bring higher user capacity, they can be highly correlated. FIG. 13 illustrates the average fAP subchannel usage ratio against the requestor/user arrival rates in a sparse deployment example. We observe that the LCA method suffers from low subchannel usage ratio for high user arrival rate, resulting in low throughput. The other three algorithms, i.e., CAGA, RESP, and NPC, keep the ratio above 50% in this particular example.

Figure 14:
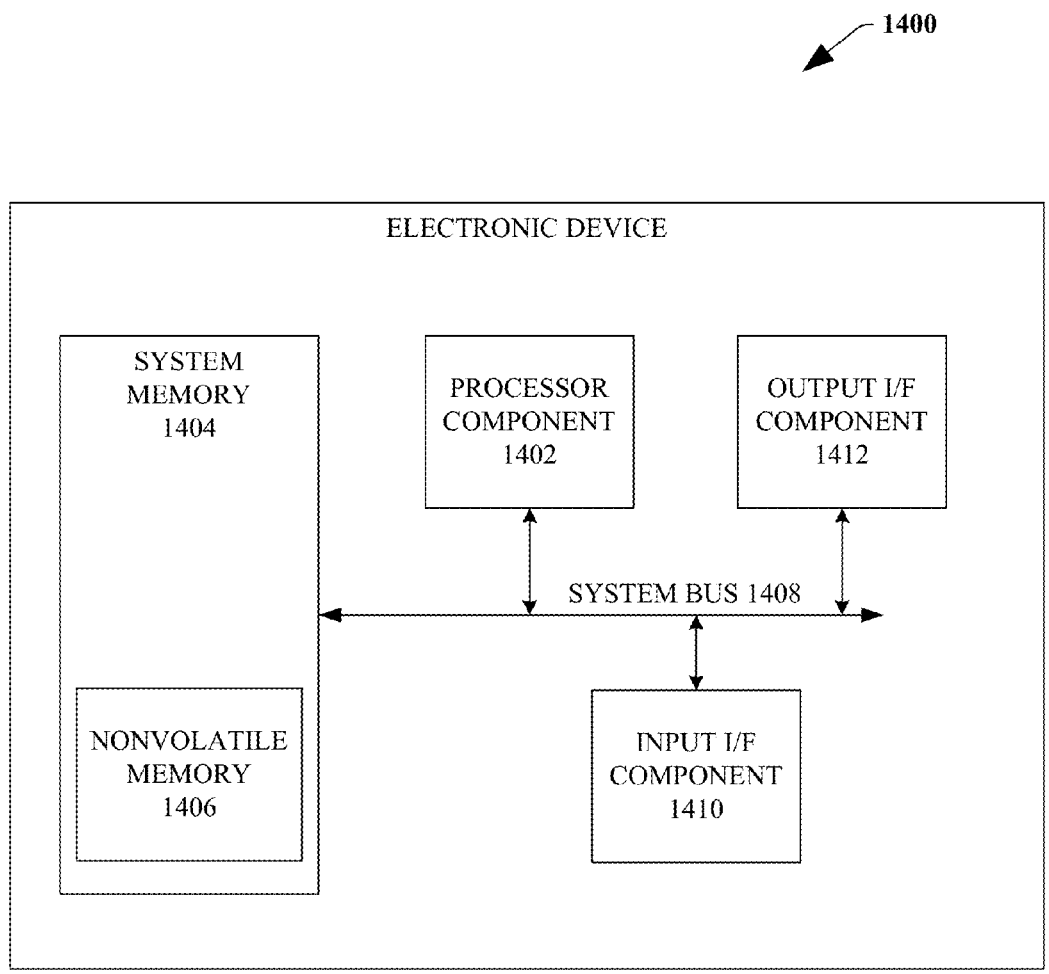
FIG. 14 illustrates a block diagram of an exemplary electronic device that can facilitate dynamic resource management for wireless network components in accordance with an aspect of the disclosed subject matter.

Referring to FIG. 14, illustrated is a block diagram of an exemplary, non-limiting electronic device 1400 that can utilize dynamic resource management for wireless network components in accordance with an aspect of the disclosed subject matter. The electronic device 1400 can include, but is not limited to, a computer, a laptop computer, or network equipment (e.g. routers, access points, femtocells, picocells), and the like.

Components of the electronic device 1400 can include, but are not limited to, a processor component 1402, a system memory 1404 (with nonvolatile memory 1406), and a system bus 1408 that can couple various system components including the system memory 1404 to the processor component 1402. The system bus 1408 can be any of various types of bus structures including a memory bus or memory controller, a peripheral bus, or a local bus using any of a variety of bus architectures.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The system memory 1404 can include computer-readable storage media in the form of volatile and/or nonvolatile memory 1406. A basic input/output system (BIOS), containing the basic routines that help to transfer information between elements within electronic device 1400, such as during start-up, can be stored in memory 1404. Memory 1404 can typically contain data and/or program modules that can be immediately accessible to and/or presently be operated on by processor component 1402. By way of example, and not limitation, system memory 1404 can also include an operating system, application programs, other program modules, and program data. As a further example, system memory can include program modules for subchannel assignment and allocation of power as disclosed hereinabove.

The nonvolatile memory 1406 can be removable or non-removable. For example, the nonvolatile memory 1406 can be in the form of a removable memory card or a USB flash drive. In accordance with one aspect, the nonvolatile memory 1406 can include flash memory (e.g., single-bit flash memory, multi-bit flash memory), ROM, PROM, EPROM, EEPROM, and/or NVRAM (e.g., FeRAM), or a combination thereof, for example. Further, the flash memory can be comprised of NOR flash memory and/or NAND flash memory.

A user can enter commands and information into the electronic device 1400 through input devices (not illustrated) such as a keypad, microphone, tablet or touch screen although other input devices can also be utilized. These and other input devices can be connected to the processor component 1402 through input interface component 1410 that can be connected to the system bus 1408. Other interface and bus structures, such as a parallel port, game port or a universal serial bus (USB) can also be utilized. A graphics subsystem (not illustrated) can also be connected to the system bus 1408. A display device (not illustrated) can be also connected to the system bus 1408 via an interface, such as output interface component 1412, which can in turn communicate with video memory. In addition to a display, the electronic device 1400 can also include other peripheral output devices such as speakers (not illustrated), which can be connected through output interface component 1412. In an aspect, other electronic devices, e.g., other fAPs in a network can be communicatively coupled to electronic device 1500 by way of input interface component 1410 and output interface component 1412, which can serve to facilitate transfer of subchannel and power allocation information among a plurality of fAPs.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description may have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
    a memory that stores executable instructions; and
    a processor, communicatively coupled to the memory, which executes or facilitates execution of the executable instructions to perform operations, comprising:
        determining first subchannel set assignment information related to allocating a first set of subchannels, the first set of subchannels comprising a first subchannel and a second subchannel, for wireless communication with a first femtocell access point device;
        determining first power allocation information related to designating a first power level of the first subchannel for wireless communication with the first femtocell access point device;
        determining second subchannel set assignment information related to allocating a second set of subchannels, the second set of subchannels comprising a third subchannel and a fourth subchannel, for wireless communication with a second femtocell access point device;
        determining second power allocation information related to designating a second power level of the third subchannel; and
        facilitating access to the first subchannel set assignment information, first power allocation information, second subchannel set assignment information, and second power allocation information.

2. The system of claim 1, wherein the allocating the first set of subchannels comprises allocating the first subchannel and the second subchannel to facilitate communicatively coupling the first femtocell access point device to a first mobile device of a plurality of mobile devices.

3. The system of claim 1, wherein the allocating the first set of subchannels comprises allocating the first subchannel to communicatively couple the first femtocell access point device to a first mobile device of a plurality of mobile devices and further comprises allocating the second subchannel to communicatively couple the first femtocell access point device to a second mobile device of the plurality of mobile devices.

4. The system of claim 1, wherein:
    the allocating the first set of subchannels comprises allocating the first subchannel to communicatively couple the first femtocell access point device to a first mobile device of a plurality of mobile devices; and
    the allocating the second set of subchannels comprises allocating the third subchannel to communicatively couple the second femtocell access point device to the first mobile device of the plurality of mobile devices.

5. The system of claim 1, wherein at least the first subchannel and the second subchannel are non-overlapping.

6. The system of claim 1, wherein:
    the first subchannel and the second subchannel overlap, at least in part; and
    designating the power level of the first subchannel is based on the power level of the second subchannel.

7. The system of claim 6, wherein the designating the power level of the first subchannel reduces interference between the first subchannel and the second subchannel.

8. The system of claim 6, wherein the designating the power level of the first subchannel improves a signal-to-noise-interference-ratio of the first subchannel.

9. The system of claim 1, wherein the first set of subchannels comprise orthogonal frequency-division multiple access subchannels.

10. The system of claim 1, wherein the allocating the first set of subchannels comprises allocating the first subchannel based on a first marginal utility value and further comprises allocating the second subchannel based on a second marginal utility value.

11. The system of claim 1, wherein the allocating the first set of subchannels comprises allocating the first subchannel and the second subchannel based on a combinatorial auction with greedy algorithm scheme.

12. The system of claim 11, wherein the combinatorial auction with greedy algorithm scheme includes sorting at least a portion of subchannels comprising the set of subchannels in terms of normalized signal-to-noise-interference ratio.

13. The system of claim 11, wherein the combinatorial auction with greedy algorithm scheme includes allocating a subchannel of the set of subchannels in an iteration of the combinatorial auction with greedy algorithm scheme and the subchannel of the allocating the subchannel is excluded from the set of subchannels in a subsequent iteration of the combinatorial auction with greedy algorithm scheme.

14. The system of claim 11, wherein the combinatorial auction with greedy algorithm scheme includes updating a subchannel allocation and updating a power level designation in an iteration of the combinatorial auction with greedy algorithm scheme.

15. The system of claim 1, wherein the allocating the first set of subchannels comprises allocating the first subchannel and the second subchannel based on a random equal subchannel partition scheme.

16. The system of claim 15, wherein the random equal subchannel partition scheme includes random permutation of the subchannels of the first set of subchannels and equal allocation of the subchannels of the first set of subchannels among a set of requestors.

17. The system of claim 15, wherein the random equal subchannel partition scheme includes an update of a power level designation in an iteration of the random equal subchannel partition scheme.

18. The system of claim 17, wherein the update of the power level designation is decoupled from allocating the first subchannel and the second subchannel in an iteration of the random equal subchannel partition scheme.

19. The system of claim 1, wherein the allocating the first set of subchannels comprises allocating the first subchannel and the second subchannel based on a local combinatorial auction scheme.

20. The system of claim 19, wherein the local combinatorial auction scheme includes updating a subchannel allocation and updating a power level designation in the absence of shared power allocation information, in an iteration of the local combinatorial auction scheme.

21. The system of claim 2, wherein the allocating the first set of subchannels comprises allocating the first subchannel and the second subchannel based on a neighbors' poor channels scheme.

22. The system of claim 21, wherein the neighbors' poor channels scheme includes updating a subchannel allocation and updating a power level designation in the absence of shared subchannel assignment information, in an iteration of the neighbors' poor channels scheme.

23. The system of claim 21, wherein the neighbors' poor channels scheme includes updating a subchannel allocation and updating a power level designation based on power allocated to a neighboring subchannel, with a preference for subchannels having lower neighboring power designations, in an iteration of the neighbors' poor channels scheme.

24. A non-transitory computer-readable storage medium storing executable instructions that, in response to execution, cause a device comprising a processor to perform operations, comprising:
 defining a valuation variable as a function of power allocated to a subchannel of a set of subchannels of a femtocell access point device;
 defining another valuation variable as a function of power allocated to another subchannel of another set of subchannels of another femtocell access point device;
 defining an access variable relating to an accessibility of the subchannel of the set of subchannels;
 defining another access variable relating to an accessibility of the other subchannel of the other set of subchannels;
 as a function of the valuation variable and the access variable, determining an allocated power for the subchannel of the set of subchannels and a subchannel assignment for the subchannel of the set of subchannels;
 as a function of the other valuation variable and the other access variable, determining another allocated power for the other subchannel of the other set of subchannels and another subchannel assignment for the other subchannel of the other set of subchannels; and
 facilitating access to information related to the subchannel assignment, the allocated power, the other subchannel assignment, and the other allocated power.

25. A method, comprising:
 determining, by a system comprising a processor, a first marginal utility value related to assigning a first subchannel of a first set of subchannels associated with a first femtocell access point device;
 determining, by the system, a second marginal utility value related to assigning a second subchannel of the first set of subchannels;
 determining, by the system, a third marginal utility value related to assigning a third subchannel of a second set of subchannels associated with a second femtocell access point device:
 determining, by the system, a fourth marginal utility value related to assigning a fourth subchannel of the second set of subchannels;
 facilitating, by the system, access to the first marginal utility value, the second marginal utility value, the third marginal utility value, and the fourth marginal utility value;
 assigning the first subchannel based on the first marginal utility and the second marginal utility; and
 assigning the second subchannel based on the first marginal utility and the second marginal utility.

26. The method of claim 25, wherein the determining the first marginal utility value includes determining an allocated power for the first subchannel and the determining the second marginal utility value includes determining an allocated power for the second subchannel.

27. The method of claim 26, wherein the determining the allocated power for the first subchannel includes determining a level of interference associated with assignment of the first subchannel at a power level.

28. The method of claim 25, wherein the assigning the first subchannel and the assigning the second subchannel are further based on a combinatorial auction with greedy algorithm scheme.

29. The method of claim 28, wherein the combinatorial auction with greedy algorithm scheme includes sorting at least a portion of the first set of subchannels in terms of normalized signal-to-noise-interference ratio.

30. The method of claim 28, wherein the combinatorial auction with greedy algorithm scheme includes assigning at least one subchannel of the first set of subchannels in an iteration of the combinatorial auction with greedy algorithm scheme and the at least one subchannel of the assignment of at least one subchannel is excluded from the first set of subchannels in a subsequent iteration of the combinatorial auction with greedy algorithm scheme.

31. The method of claim 28, wherein the combinatorial auction with greedy algorithm scheme includes updating a subchannel assignment and updating a power allocation in an iteration of the combinatorial auction with greedy algorithm scheme.

32. The method of claim 25, wherein the assigning the first subchannel and the assigning the second subchannel are further based on a random equal subchannel partition process.

33. The method of claim 32, wherein the random equal subchannel partition process includes randomly permuting the subchannels of the first set of subchannels and equally allocating the subchannels of the first set of subchannels among a set of requestors.

34. The method of claim 32, wherein the random equal subchannel partition process includes updating a power allocation in an iteration of the random equal subchannel partition process.

35. The method of claim 34, wherein updating the power allocation in an iteration is decoupled from the assigning the first subchannel and the assigning the second subchannel, for that iteration of the random equal subchannel partition process.

36. The method of claim 25, wherein the assigning the first subchannel and the assigning the second subchannel are further based on a local combinatorial auction process.

37. The method of claim 36, wherein the local combinatorial auction process includes updating a subchannel assignment and updating a power allocation in the absence of shared power allocation information, in an iteration of the local combinatorial auction process.

38. The method of claim 25, wherein the assigning the first subchannel and the assigning the second subchannel are further based on a neighbors' poor channels process.

39. The method of claim 38, wherein the neighbors' poor channels process includes updating a subchannel assignment and updating a power allocation in the absence of shared subchannel assignment information, in an iteration of the neighbors' poor channels process.

40. The method of claim 38, wherein the neighbors' poor channels process includes updating a subchannel assignment and updating a power allocation based on power allocated to neighboring subchannels, preferring subchannels having lower neighboring power allocations, in an iteration of the neighbors' poor channels process.

41. The method of claim 25, wherein the first subchannel is tentatively assigned prior to the determining the first marginal utility value, and the second subchannel is tentatively assigned prior to the determining the second marginal utility value.

42. The method of claim 25, further comprising:
assigning a first set of the set of subchannels, comprising the first subchannel and second subchannel, to the first femtocell access point device, and
assigning a second set of subchannels, comprising the second subchannel includes assigning a second subset of the set of subchannels, including the second third subchannel and fourth subchannel, to a second femtocell access point device.

43. The method of claim 42, wherein the first set of the set of subchannels and the second set of the set of subchannels do not overlap.

44. The method of claim 25, wherein the first set of subchannels comprises orthogonal frequency-division multiple access subchannels.

45. A system, comprising:
means for defining a valuation variable as a function of power allocated to a subchannel of a set of subchannels related to a femtocell access point device;
means for defining an access variable relating to an accessibility of the subchannel;
means for determining an allocated power and a subchannel assignment for the subchannel of the set of subchannels as a function of the valuation variable and the access variable;
means for defining another valuation variable as a function of power allocated to another subchannel of another set of subchannels related to another femtocell access point device;
means for defining another access variable relating to another accessibility of the other subchannel;
means for determining another allocated power and another subchannel assignment for the other subchannel of the other set of subchannels as a function of the other valuation variable and the other access variable; and
means for facilitating access to information related to the subchannel set assignment, the allocation power, the other subchannel set assignment, and the other allocated power.

* * * * *